United States Patent
Hong et al.

(10) Patent No.: US 9,315,389 B2
(45) Date of Patent: Apr. 19, 2016

(54) HYDROGEN SURFACE-TREATED GRAPHENE, FORMATION METHOD THEREOF AND ELECTRONIC DEVICE COMPRISING THE SAME

(71) Applicant: University-Industry Foundation, Yonsei University, Seoul (KR)

(72) Inventors: Jongill Hong, Seoul (KR); Jangyup Son, Gyeonggi-do (KR)

(73) Assignee: University-Industry Foundation, Yonsei University (KR)

( * ) Notice: Subject to any disclaimer, the term of this patent is extended or adjusted under 35 U.S.C. 154(b) by 0 days.

(21) Appl. No.: 14/516,746

(22) Filed: Oct. 17, 2014

(65) Prior Publication Data

US 2015/0110706 A1    Apr. 23, 2015

(30) Foreign Application Priority Data

Oct. 17, 2013 (KR) .................. 10-2013-0124100
Jul. 1, 2014 (KR) .................. 10-2014-0081789

(51) Int. Cl.
*C01B 31/04* (2006.01)
*C01B 31/02* (2006.01)

(52) U.S. Cl.
CPC ............. *C01B 31/0484* (2013.01); *C01B 31/02* (2013.01)

(58) Field of Classification Search
CPC  C01B 31/04; C01B 31/0407; C01B 31/0415; C01B 2204/00; C01B 2204/02; C01B 2204/04; C01B 2204/06; C01B 2204/065; C01B 2204/20; C01B 2204/22; C01B 2204/24; C01B 2204/28; C01B 2204/30; C01B 2204/32; C01B 31/0484

USPC .......................................... 423/448
See application file for complete search history.

(56) References Cited

U.S. PATENT DOCUMENTS

| | | | |
|---|---|---|---|
| 2011/0143045 A1* | 6/2011 | Veerasamy | B82Y 30/00 427/495 |
| 2011/0266326 A1* | 11/2011 | Rabe | B82Y 30/00 225/103 |
| 2012/0184065 A1 | 7/2012 | Gharib et al. | |
| 2013/0126865 A1 | 5/2013 | Chiang et al. | |

OTHER PUBLICATIONS

Shi, et al., Patterning Graphene with Zigzag Edges by Self-Aligned Anisotropic Etching, Adv. Mater. 2011; 23: 3061-3065 and Supporting Information (pp. 1-10).*

Diankov et al., "Extreme Monolayer-Selectivity of Hydrogen-Plasma Reactions with Graphene", ACS Nano, 7:2, 1323-1332, (2013).

(Continued)

*Primary Examiner* — Daniel C McCracken
(74) *Attorney, Agent, or Firm* — Cooley LLP; Matthew Pavao

(57) ABSTRACT

The present invention relates to hydrogen surface-treated graphene, a formation method thereof, and an electronic device including the same. The graphene according to one exemplary embodiment of the present invention can be useful in preparing hydrogen surface-treated graphene having a band gap using simple methods through indirect hydrogen plasma treatment. Also, the graphene according to one exemplary embodiment of the present invention can be useful in forming two regions having different band gaps through the indirect hydrogen plasma treatment, and thus can be useful in reducing the processing time and the processing cost since the graphene is directly applicable to electronic devices such as transistors, and touch panels.

10 Claims, 7 Drawing Sheets

(56) References Cited

OTHER PUBLICATIONS

Burgess, James S. et al., "Tuning the electronic properties of graphene by hydrogenation in a plasma enhanced chemical vapor deposition reactor", Carbon, Elsevier, Oxford, GB, vol. 49, No. 13, 4420-4426, (Jun. 9, 2011).

Balog, Richard et al., "Badgap opening in graphene induced by patterned hydrogen adsorption.", Nature Materials, vol. 9, No. 4, 315-319, (Mar. 14, 2010).

European Search Report, dated Mar. 25, 2015 for EP Application No. 14189205.9, filed Apr. 22, 2015.

* cited by examiner

HYDROGEN SURFACE-TREATED GRAPHENE, FORMATION METHOD THEREOF AND ELECTRONIC DEVICE COMPRISING THE SAME

CROSS-REFERENCE TO RELATED APPLICATION

This application claims priority to and the benefit of Korean Patent Application Nos. 2013-0124100 and 2014-0081789, filed on Oct. 17, 2013 and Jul. 1, 2014 respectively, the disclosure of which is incorporated herein by reference in its entirety.

BACKGROUND

1. Field of the Invention

The present invention relates to hydrogen surface-treated graphene, and a formation method thereof and an electronic device including the same.

2. Discussion of Related Art

Graphene is a flat single-layer sheet formed of carbon atoms via $sp^2$ bonds, a structure of which may be found in a pattern in which the carbon atoms are staked in a hexagonal crystal lattice. Therefore, graphene has a basic structure forming materials consisting of carbon atoms, such as graphite, carbon nanotubes, and fullerenes in the form of a buckyball. Also, graphene shows completely different properties than the carbon nanotubes in which carbon atoms are connected in a tubular geometry because of the structural difference. Graphene has emerged as the most promising material since it has an extensive range of advantages such as mechanical and electrical characteristics which the carbon nanotubes have, and also shows peculiar physical properties which two-dimensional materials have.

Carbon allotropes formed mainly via covalent bonds have physical properties as determined according to a linear combination mode for the wave functions of the four outermost electrons. Most of solids formed via covalent bonds have the maximum probability distribution of finding electrons between the atoms. One representative example of the carbon allotropes is diamond.

However, only the linear combinations of the three outermost electrons in graphene participate in formation of strong covalent bonds between carbon atoms to form a hexagonal network plane, and the wave functions of the remaining outermost electrons are present in a pattern perpendicular to the plane. The state of electrons which are parallel to the plane to participate in formation of strong covalent bonds is referred to as a σ-orbital, and the state of electrons perpendicular to the plane is referred to as a π-orbital. The wave functions of electrons near the Fermi level determining the physical properties of graphene are composed of linear combinations of π-orbitals.

In recent years, many researchers have paid attention to the fact that graphene shows zero-band gap characteristics due to the hexagonal network structure of graphene, the structure of two triangular sub-lattices, and a thickness corresponding to the size of one atom. Because of the zero-band gap characteristics, however, graphene has a problem in that it has limited applications to metal conductive films or wires in use for electronic devices.

Ardent research is being conducted recently on controlling a band gap of graphene. Also, much research is being conducted on controlling a band gap using a method of forming graphene in a nano-ribbon or nano-pattern and a method of applying an electric field to a substrate. However, the results of research on accurately controlling a band gap of graphene and search on methods of accurately controlling a band gap of graphene are not published so far.

SUMMARY OF THE INVENTION

1. Technical Problem

The present invention is directed to providing hydrogen surface-treated graphene, a formation method thereof, and an electronic device including the same, which are able to control a band gap of graphene without any defects through an indirect hydrogen plasma treatment method using hydrogen.

2. Technical Solution

One aspect of the present invention provides a hydrogen surface-treated graphene, a formation method thereof, and an electronic device including the same.

As one example of the hydrogen surface-treated graphene, hydrogen surface-treated graphene having a band gap of 0.1 to 5.5 eV and satisfying the following Mathematical Expression 1 may be provided:

$$10 \leq I_D/I_{D'} \qquad \text{[Mathematical Expression 1]}$$

In Mathematical Expression 1, $I_D$ represents an intensity of a peak present in a region of Raman shift of $1{,}350 \pm 5\ \mathrm{cm}^{-1}$, and $I_{D'}$ represents an intensity of a peak present in a region of Raman shift of $1{,}620 \pm 5\ \mathrm{cm}^{-1}$, as measured after irradiation with a 514 nm laser.

As one example of the formation method of the hydrogen surface-treated graphene, a surface treatment method of graphene including performing indirect hydrogen plasma treatment may be provided. Here, the surface treatment method of graphene may include forming a protective layer patterned on the graphene before the indirect hydrogen plasma treatment; or forming a pattern on the plasma-treated graphene by partially applying heat or energy to the plasma-treated graphene after the indirect hydrogen plasma treatment.

3. Effect of the Invention

The graphene according to one exemplary embodiment of the present invention can be useful in preparing hydrogen surface-treated graphene having a band gap using simple methods through indirect hydrogen plasma treatment. Also, the graphene according to one exemplary embodiment of the present invention can be useful in forming two regions having different band gaps without any defects through the indirect hydrogen plasma treatment, and thus can be useful in reducing the processing time and the processing cost since the graphene is directly applicable to electronic devices such as transistors, and touch panels.

DESCRIPTION

Figure 1:
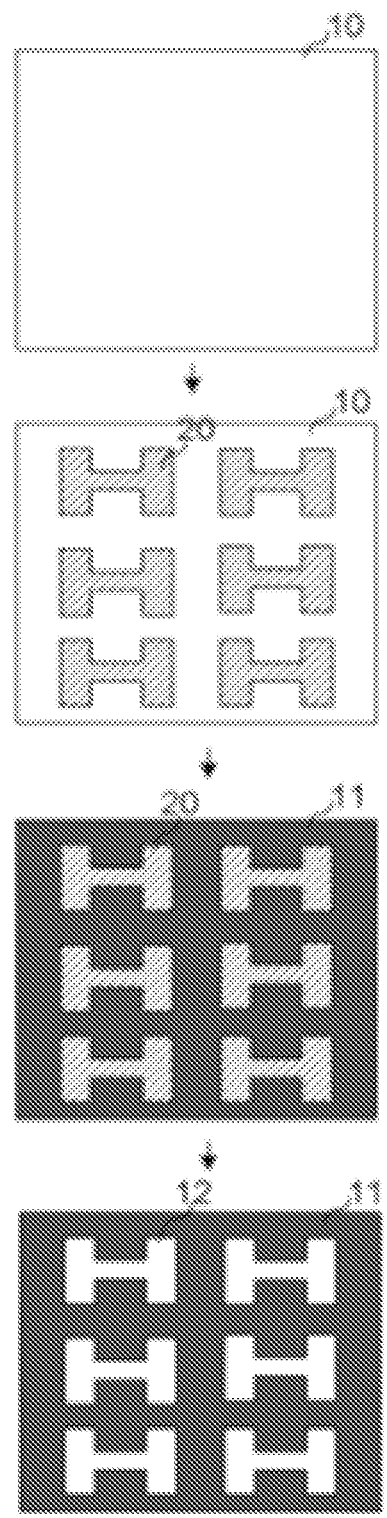
FIG. 1 is a schematic view showing a formation method of graphene according to one exemplary embodiment of the present invention.

In the present invention, the term "indirect hydrogen plasma treatment" refers to indirect treatment using plasma flow generated under a hydrogen atmosphere. At this time, the hydrogen atmosphere is comprised of a low content of argon gas (ex, 5 mol % or less of the total gas) or, if necessary, is not comprised of any argon gas.

Also, the term "hydrogen surface-treated graphene" refers to graphene subjected to the indirect hydrogen plasma treatment.

The present invention may provide hydrogen surface-treated graphene, a formation method thereof, and an electronic device including the same.

As one example of the hydrogen surface-treated graphene, hydrogen surface-treated graphene having a band gap of 0.1 to 5.5 eV and satisfying the following Mathematical Expression 1 is provided:

$$10 \leq I_D/I_{D'}$$ [Mathematical Expression 1]

In Mathematical Expression 1, $I_D$ represents an intensity of a peak present in a region of Raman shift of 1,350±5 cm$^{-1}$, and $I_{D'}$ represents an intensity of a peak present in a region of Raman shift of 1,620±5 cm$^{-1}$, as measured after irradiation with a 514 nm laser.

The non-hydrogenated graphene form a 2D hexagonal network through strong covalent bonds between carbon atoms. The graphene contains a σ-bond as a sp$^2$ binding structure formed through strong covalent bonds between carbon atoms, which form a plane, and a π-bond formed as a sp$^3$ binding structure perpendicular to the plane with one electron remaining on an unbound p-orbital. In this case, the graphene may show high conductivity characteristics through the unbound π-bond in a direction perpendicular to the plane. However, the graphene according to one exemplary embodiment of the present invention may be endowed with a band gap by adsorbing hydrogen atoms into the electron loci formed on the unbound p-orbital in a direction perpendicular to the plane to block the π-bond. Therefore, according to one exemplary embodiment of the present invention, the conductivity characteristics of graphene may be controlled by adjusting the hydrogen adsorption ratio.

For example, the band gap may be in a range of 0.1 to 0.5 eV, 1.0 to 5.5 eV, 0.1 to 3 eV, or 3 to 5.5 eV. Due to the band gap within this range, the graphene may be used as various electronic materials. Specifically, conventional graphene has high mechanical and electrical characteristics, but has been limited on use as the electronic materials required to have a band gap due to a zero band gap. However, the graphene according to one exemplary embodiment of the present invention may be used to solve the above-described problems through hydrogenation.

For example, the hydrogenation may be performed by performing indirect hydrogen plasma treatment. In this case, an indirect plasma apparatus may be used herein. The hydrogen surface-treated graphene according to one exemplary embodiment of the present invention may be subjected to the indirect hydrogen plasma treatment, and thus may satisfy the Mathematical Expression 1. For example, the $I_D/I_{D'}$ may be greater than or equal to 10.

Specifically, this may be confirmed by measuring the Raman spectra of the graphene according to one exemplary embodiment of the present invention. $I_D$ represents an intensity of a peak present in a range of Raman shift of 1,350±5 cm$^{-1}$, that is, an intensity of a peak D. Here, the peak D may be a peak indicating that hydrogen atoms are adsorbed onto graphene. Also, $I_{D'}$ represents an intensity of a peak present in a region of Raman shift of 1,620±5 cm$^{-1}$, that is, an intensity of a peak D'. Here, the peak D' may be a peak indicating that defects may occur during a process of adsorbing hydrogen atoms onto graphene. In this case, atomic vacancy-type defects and sp$^3$-type defects may be present as the defects. Among these, the atomic vacancy-type defects may cause permanent damage to the hydrogen surface-treated graphene, and thus the reversible sp$^3$-type defects may be preferred to obtain the hydrogen surface-treated graphene having a small number of defects.

The types of the defects may be inferred from the $I_D/I_{D'}$ value. For example, when the $I_D/I_{D'}$ value is greater than or equal to 10, the defects may refer to the sp$^3$-type defects. Specifically, the $I_D/I_{D'}$ value may be in a range of 13 to 20.

The hydrogen surface-treated graphene includes a first region and a second region, both of which have different band gaps. Here, the second region may have a band gap of 1.0 to 5.5 eV.

Specifically, patterns on which the respective regions have different band gaps may be formed through hydrogenation, as described above.

For example, the surface-treated graphene may include a first region of graphene whose surface has a low hydrogen adsorption ratio, and a second region of graphene whose surface has a high hydrogen adsorption ratio. In this case, the first region may show high conductivity characteristics, as described above. Also, the second region may block the π-bond by adsorbing hydrogen atoms into the electron loci formed on the unbound p-orbital in a direction perpendicular to the plane, and may control conductivity characteristics of graphene by adjusting the hydrogen adsorption ratio on a surface of the graphene.

In this case, the difference between the band gaps of the first region and the second region of the hydrogen surface-treated graphene may be greater than or equal to 0.5 eV.

For example, the band gap of the first region may be in a range of 0.1 to 0.5 eV, 0.1 to 0.4 eV, or 0.1 to 0.3 eV. The first region having a band gap within this band gap range may refer to a semiconductive region. Also, the band gap of the second region may, for example, be in a range of 1.0 to 5.0 eV, 2.5 to 5.0 eV, or 3.5 to 5.0 eV. The second region having a band gap within this band gap range may refer to a semiconductive or conductive region.

The hydrogen surface-treated graphene may include the first and second regions, in which the difference between the band gaps is greater than or equal to 0.5 eV, so that the semiconductive and conductive regions can be realized on the same plane of graphene.

The second region of the hydrogen surface-treated graphene may have a sheet resistance of 1 to 500 MΩ/sq.

For example, the sheet resistance of the second region may be in a range of 1 to 450 MΩ/sq, 10 to 400 MΩ/sq, or 100 to 300 MΩ/sq. Also, the sheet resistance of the first region may be in a range of 500 to 900 Ω/sq, 500 to 800 Ω/sq, or 500 to 600 Ω/sq. In this case, the sheet resistances of the respective regions may be controlled within this sheet resistance range to prepare the patterned graphene whose regions have different conductivity characteristics.

The hydrogen surface-treated graphene may include a non-hydrogenated first region, and a hydrogen surface-treated second region.

Specifically, according to one exemplary embodiment of the present invention, an indirect hydrogen plasma treatment method is used to prepare the graphene including the first region and the second region. Here, a pattern may be formed using a method, which includes forming a protective layer patterned on the graphene before the performing of the indirect hydrogen plasma treatment, or forming a pattern on plasma-treated graphene by applying heat or energy to the plasma-treated graphene after the performing of the indirect hydrogen plasma treatment. In this case, a region on which a protective layer is formed or to which the heat or energy is not applied may be referred to as a non-hydrogenated first region, and a region on which a protective layer is not formed or to which the heat or energy is applied may be referred to as a hydrogen surface-treated second region.

The hydrogen surface-treated graphene may satisfy the following Mathematical Expression 2.

$$\Delta E^* \leq 1.5 \qquad \text{[Mathematical Expression 2]}$$

In Mathematical Expression 2, $\Delta E^*$ represents a color difference between any one point of the first region and any one point of the second region, as measured for the two points using the Commission internationale de L'Eclairage (CIE) color coordinates.

Specifically, the $\Delta E^*$ value is quoted as a CIE Lab color space that is a chromatic value by defined by the CIE. The CIE Lab color space is a globally standardized color space since a color difference which can be sensed by the observer's eyes may be substantially matched with a color difference represented as a color value in the color space. The term "color difference" in the CIE Lab color space may be referred to as a difference between positions on the coordinates. The color difference is recognized to be high when two objects are stereoscopically remote from each other, whereas the colors are recognized to be identical when the two objects are stereoscopically close to each other. Such a color difference is represented by "$\Delta E^*$" as a digital representation. Generally, when the $\Delta E^*$ value is less than or equal to 0.5, an observer hardly recognizes a color difference. Also, when the $\Delta E^*$ value is less than or equal to 1.5, the observer recognizes a very slight color difference. On the other hand, when the $\Delta E^*$ value is greater than 1.5, an observer may recognize a color difference. Also, when the $\Delta E^*$ value is greater than or equal to 2.0, the observer may recognize a very high color difference. However, such a $\Delta E^*$ value has been generally used, but there are no special standards for the $\Delta E^*$ value. For example, when the $\Delta E^*$ value is maintained to be in a range of 0.8 to 1.5 upon production of products, it may mean that the color difference is well managed for the products.

The $\Delta E^*$ value may be calculated through the following Mathematical Expression 3.

$$\Delta E^* = \sqrt{(\Delta L^*)^2 + (\Delta a^*)^2 + (\Delta b^*)^2} \qquad \text{[Mathematical Expression 3]}$$

In Mathematical Expression 3, $\Delta L^*$ represents a difference between components L1* and L2* of the color coordinates E1 and E2 of two colors, that is, a brightness difference. Also, $\Delta a^*$ also represents a difference between components a1* and a2* of the color coordinates E1 and E2, that is, a red-green color difference, and $\Delta b^*$ also represents a difference between components b1* and b2* of the color coordinates E1 and E2, that is, a yellow-blue color difference.

Specifically, in Mathematical Expression 2, the $\Delta E^*$ value may be controlled below a level at which an observer may recognize a color difference with respect to the first region and the second region of the graphene according to one exemplary embodiment of the present invention. As a result, it is possible to solve the problem in which patterns formed on electronic devices manufactured by conventional processes such as etching are recognized by an observer. For example, the $\Delta E^*$ value may be in a range of 0.001 to 1.5, 0.001 to 1.2, 0.001 to 1.0, or 0.001 to 0.8.

In the hydrogen surface-treated graphene, the second region may have a surface having an average hydrogen adsorption ratio of 15% or more.

When it is assumed that the maximum value in a range in which hydrogen atoms are attachable to a surface of graphene is set to 100%, the hydrogen adsorption ratio of the surface of the second region refers to a ratio of the hydrogen atoms adsorbed onto the surface of graphene. For example, the hydrogen adsorption ratio may refer to a ratio of the hydrogen atoms adsorbed onto the surface of graphene with respect to the number of carbon atoms.

Specifically, the second region may be referred to as a hydrogen surface-treated region, and the surface of the second region may have a higher hydrogen adsorption ratio than the surface of the first region. For example, the hydrogen adsorption ratio of the surface of the second region may be in a range of 17 to 25%, 20 to 25%, or 22 to 25%. When the second region has a hydrogen adsorption ratio falling within this range, the second region may have a band gap of 2.0 to 5.5 eV, and may show high sheet resistance, thereby forming semiconductive and conductive regions.

Also, the first region is a region which is not directly exposed to the indirect hydrogen plasma treatment or is partially reduced by laser irradiation. In this case, the surface of the first region may have a hydrogen adsorption ratio of 5 to 13%, and may optionally have a hydrogen adsorption ratio of less than 5%. For example, the hydrogen adsorption ratio of the surface of the first region may be in a range of 5 to 12%, 5 to 10%, or 5 to 8%. When the first region has a hydrogen adsorption ratio within this range, the first region may have a low band gap and show low sheet resistance, thereby forming a semiconductive region.

The second region of the hydrogen surface-treated graphene may have an average hall mobility of 1 to 200 $cm^2/V \cdot s$, and the difference between hall mobilities of the first region and the second region may be greater than or equal to 10 $cm^2/V \cdot s$.

Specifically, graphene has high mobility characteristics such as electrical conductivity and carrier mobility. However, the mobility of graphene may be reduced by subjecting graphene to the indirect hydrogen plasma treatment to provide a band gap to graphene. In this case, the average hall mobility of the second region may be controlled to a range from 1 to 200 cm$^2$/V·s, depending on a hydrogenation level of graphene.

For example, when graphene is subjected to the indirect hydrogen plasma treatment for approximately 5 seconds, graphene is shown to have a band gap of approximately 1 to 2 eV. In this case, the hall mobility of graphene may be reduced to 10 to 80 cm$^2$/V·s. Also, when graphene is subjected to the indirect hydrogen plasma treatment for approximately 10 seconds or more, graphene is shown to have a band gap of approximately 3 to 5.5 eV. In this case, the hall mobility of graphene may be reduced to 1 to 5 cm$^2$/V·s. It can be seen that, when the hall mobility is within this range, the hall mobility of graphene is identical to or superior to the hall mobility of silicon (Si) atoms widely used in electronic devices such as semiconductors since graphene has higher mobility characteristics, compared to conventional graphene derivatives, and that the hall mobility of graphene is extraordinarily superior to the electrons and hall mobility of semiconductors used in flexible substrates.

The hydrogen surface-treated graphene may satisfy the following Mathematical Expression 4.

$$3 \leq I_D/I_G \leq 5 \quad \text{[Mathematical Expression 4]}$$

In Mathematical Expression 4, $I_D$ represents an intensity of a peak observed in the vicinity of Raman shift of 1,350 cm$^{-1}$, and $I_G$ represents an intensity of a peak observed in the vicinity of Raman shift of 1,600 cm$^{-1}$.

Specifically, this may be confirmed by measuring the Raman spectra of the graphene according to one exemplary embodiment of the present invention. In this case, $I_D$ represents an intensity of a peak D observed in the vicinity of Raman shift of 1,350 cm$^{-1}$, as described above. Here, the peak D may be a peak indicating that hydrogen atoms are adsorbed onto graphene. Also, $I_G$ represents an intensity of a peak G observed in the vicinity of Raman shift of 1,600 cm$^{-1}$. For example, the vicinity of Raman shift of 1,600 cm$^{-1}$ may refer to an intensity ranging from 1,580 to 1,610 cm$^{-1}$. For example, the $I_D/I_G$ value may be in a range of 3 to 4.5, 3 to 4, or 4 to 5. From the $I_D/I_G$ value within this range, it can be seen that hydrogen atoms are adsorbed into the surface of graphene to form a band gap.

When heat or energy is applied to the hydrogen surface-treated graphene through the indirect hydrogen plasma treatment, the hydrogen atoms adsorbed into the surface of graphene may be detached, and reduced into conventional non-hydrogenated graphene.

For example, the hydrogen surface-treated region of graphene may be reduced into non-hydrogenated graphene by a heat treatment process or a laser irradiation process. This is one way for determining that the atomic vacancy-type defects causing permanent damage to graphene occur at a low frequency.

Specifically, the non-hydrogenated graphene may be subjected to the indirect hydrogen plasma treatment to prepare hydrogen surface-treated graphene. Thereafter, the hydrogen surface-treated graphene may be thermally treated at a temperature of 150 to 250° C. for 40 to 300 minutes to be reduced into the original form of graphene before the plasma treatment. In the related art, the defects may be caused to graphene during a process of subjecting a surface of graphene to the indirect hydrogen plasma treatment, which may be accompanied with the defects causing permanent damage to graphene. However, the hydrogen surface-treated graphene according to one exemplary embodiment of the present invention may return to conventional non-hydrogenated graphene by completely detaching hydrogen atoms from the hydrogen surface-treated graphene by means of heat treatment. This may means that the defects do not occur during a process of surface-treating graphene and reducing the surface-treated graphene into graphene before the surface treatment. As a method of determining whether graphene is reduced, the reduction of graphene may be determined by measuring a band gap. For example, when graphene whose band gap is opened to approximately 5 eV through indirect hydrogen plasma treatment is thermally treated at a temperature of 150° C. or higher for approximately 40 minutes, the band gap may be closed to 0.1 eV or less. Substantially, the band gap of the thermally treated graphene is 0 eV, and thus thermally treated graphene may be reduced into the original form of graphene without any defects.

The graphene may have a stacked structure including 2 to 20 layers.

By way of example, an n$^{th}$ layer (n is an integer ranging from 2 to 20) of the graphene having the stacked structure may have a pattern formed therein. Here, the pattern may include a non-hydrogenated first region and a hydrogen surface-treated second region.

Specifically, the graphene may be optionally formed to have 2 to 20 layers, and at least one of the respective layers may have a pattern formed therein, the pattern including a non-hydrogenated first region, and a hydrogen surface-treated second region. As a result, it is possible to form graphene having two regions having different band gaps formed on the same surface thereof.

As necessary, each of the layers may include a non-hydrogenated first region, and a hydrogen surface-treated second region, and an n$^{th}$ layer (n is an integer ranging from 2 to 20) and an n−1$^{st}$ layer of the graphene having the stacked structure may include hydrogen surface-treated regions having different patterns.

The patterns of the respective layers may be formed in various ways using a method of subjecting graphene, on which a pattern is formed using lithography, to indirect hydrogen plasma treatment, or a method of irradiating the hydrogen surface-treated graphene with a laser.

Also, the present invention may provide a surface treatment method of graphene. By way of example, a surface treatment method of graphene including forming indirect hydrogen plasma treatment may be provided. Here the surface treatment method may include forming a protective layer patterned on graphene before the performing of the indirect hydrogen plasma treatment, or forming a pattern on the plasma-treated graphene by partially applying heat or energy to the plasma-treated graphene after the performing of the indirect hydrogen plasma treatment.

For example, a surface treatment method of graphene including performing the indirect hydrogen plasma may be provided. Specifically, unlike a method of directly subjecting graphene to plasma treatment, the indirect hydrogen plasma treatment has an advantage in that graphene may be surface-treated without any surface defects in graphene, which may occur during a plasma treatment process, since plasma does not come in direct contact with graphene by generating plasma to expose graphene.

Specifically, the indirect hydrogen plasma treatment may be performed using plasma which is generated after argon-free hydrogen gas is injected into an indirect plasma apparatus. In this case, the plasma generation may be elaborately adjusted using a controller.

When graphene is surface-treated with plasma as in related art, a mixed gas of hydrogen and argon has been used in a plasma generation process, but has a problem in that defects occur on a surface of graphene due to the presence of the remaining argon. However, hydrogen gas containing no argon gas is used herein. In this case, when graphene is hydrogenated using the resulting hydrogen plasma, it is possible to prevent defects on a surface of the hydrogen surface-treated graphene.

The inner partial pressure of the hydrogen gas injected into the plasma apparatus may be less than or equal to 15 mTorr. For example, the inner partial pressure of the hydrogen gas may be in a range of 1 to 15 mTorr, 5 to 15 mTorr, or 10 to 15 mTorr. The flow rate of the hydrogen gas may be adjusted by controlling the inner partial pressure of the hydrogen gas within this pressure range. As a result, an amount of hydrogen plasma and energy may be adjusted within this range in which the defects do not occur during a graphene hydrogenation process.

Graphene may be treated at an angle of 0 to 90° with respect to a direction of indirect hydrogen plasma treatment. For example, the hydrogen plasma generated in the indirect plasma apparatus is allowed to flow through channels in the apparatus, and a graphene sample may be positioned at an angle of 0 to 90° with respect to the flow of the hydrogen plasma to prepare hydrogen surface-treated graphene. For example, a position angle of the graphene may be set so that the graphene can be positioned at an angle of 0 to 5°, 5 to 90°, or 60 to 90°. In this case, the angle of 0° may mean that the graphene in positioned horizontally with respect to the flow of the hydrogen plasma, and the angle of 90° may mean that the graphene in positioned vertically with respect to the flow of the hydrogen plasma. A hydrogenation level of graphene may be adjusted by adjusting the position angle within this angle range.

The plasma treatment may be performed for 1 to 1,000 seconds. For example, an amount of hydrogen atoms adsorbed onto the surface of graphene may be adjusted according to the treatment time. When the plasma treatment is performed for 100 seconds or more, an area of the hydrogen surface treated surface of graphene may be approximately 25%.

As described above, the hydrogen surface-treated graphene prepared using the method may be endowed with a band gap by adsorbing hydrogen atoms into the electron loci formed on the unbound p-orbital in a direction perpendicular to a plane of graphene to block a π-bond. In this case, the blocked π-bond is not permanently damaged, but reduced into the original form of graphene before the plasma treatment through heat treatment. The heat treatment may be performed at a temperature of 150° C. or higher. Thus, the hydrogen atoms may be detached. As a result, when graphene is hydrogenated using the method according to one exemplary embodiment of the present invention, it can be seen that the defects causing the permanent damage may be accompanied.

By way of example, the forming of the protective layer patterned on the graphene may include forming a protective layer patterned on the graphene before the performing of the indirect hydrogen plasma treatment, and removing the protective layer after the performing of the indirect hydrogen plasma treatment.

Specifically, when the graphene patterned through the formation of the protective layer patterned on the graphene is formed before the performing of the indirect hydrogen plasma treatment, the graphene may be formed using a method such as lithography.

For example, graphene may be formed on a substrate. The substrate is not particularly limited as long as it is used as a substrate for electronic devices. For example, the substrate may include at least one selected from the group consisting of a metal plate, glass, sapphire, polycarbonate (PC), polyimide (PI), polyethylene terephthalate (PET), polyethersulfone (PES), and polymethymethacrylate (PMMA).

Next, a patterned protective layer may be formed on the graphene. In this case, the shape of the pattern is not particularly limited, and various types of patterns may be prepared according to the fields of application. A region of graphene which is exposed and a region of graphene which is not exposed may be formed due to the pattern formed thus. On the other hand, when the graphene is subjected to the indirect hydrogen plasma treatment, an exposed region may be hydrogenated to form a predetermined band gap.

The band gap of the region on which the pattern is formed so that the region is not directly exposed to hydrogen plasma may be in a range of 0.1 to 0.5 eV, and the band gap of the region on which the pattern is not formed so that the region is exposed to the hydrogen plasma may be in a range of 1.0 to 5.5 eV.

The graphene having the two regions different band gaps may be prepared using such a method, and may be prepared using a simpler process, compared to electronic devices such as transistors formed by performing a conventional etching process several times, and thus has an advantage in aspects of the processing time and cost.

By way of another example, the forming of the pattern on the plasma-treated graphene by partially applying the heat or energy to the plasma-treated graphene may include forming a pattern by irradiating the indirect hydrogen plasma-treated graphene with a laser after the performing of the indirect hydrogen plasma treatment.

For example, the graphene surface-treated with hydrogen plasma by means of the indirect hydrogen plasma treatment may be formed by subjecting a surface of graphene to indirect hydrogen plasma treatment using the same indirect hydrogen plasma treatment method as described above. Thereafter, the hydrogen surface-treated graphene may return to the original form of graphene whose unique hexagonal structure is rearranged before the plasma treatment by irradiating the hydrogen surface-treated graphene with a laser to reduce the hydrogen surface-treated graphene having a desired region. In this case, a region reduced into the original form of graphene before the indirect hydrogen plasma treatment by laser irradiation may be a first region, and a region other than the first region may be a second region. As a result, the patterned graphene may be formed.

For example, the laser irradiation may be performed using a heat treatment process such as sequential lateral solidification (SLS), excimer laser annealing (ELA), furnace annealing (FA), or rapid thermal annealing (RTA). Specifically, the laser irradiation may be performed using ELA. This is because the heat treatment may be performed at a low temperature, and thus a surface of graphene may be reduced at a short period of time while minimizing the defects occurring on the surface of graphene.

The band gap of the patterned region formed by the laser irradiation may be in a range of 0.1 to 0.5 eV, and the band gap of the region which is not irradiated with a laser may be in a range of 1.0 to 5.5 eV.

Specifically, the band gap of graphene reduced by irradiating the hydrogen surface-treated graphene with a laser to detach hydrogen atoms adsorbed onto the carbon atoms of graphene may be in a range of 0.1 to 0.5 eV, and the band gap of the hydrogen surface-treated graphene which is not irradiated with a laser may be in a range of 1.0 to 5.5 eV.

When the formation of the pattern on the plasma-treated graphene by partially applying heat or energy to the plasma-treated graphene is performed after the performing of the indirect hydrogen plasma treatment, the surface temperature of graphene having a region to which the heat or energy is applied may be greater than or equal to 200° C.

Specifically, the surface temperature of graphene to which the heat or energy is applied may be in a range of 200 to 300° C., 220 to 300° C., or 250 to 280° C. When the surface temperature of graphene to which the heat or energy is applied is adjusted within this temperature range, the surface of graphene may be reduced by heat treatment for a short period of time while minimizing the defects occurring on the surface of graphene. Thus, the patterned graphene may be prepared by irradiating the hydrogen surface-treated graphene with a laser.

The present invention may provide an electronic device including the hydrogen surface-treated graphene. For example, the electronic device may include a transistor, and a touch panel.

The transistor may be applied to electronic devices, memory devices, and electronic parts including resistors.

For example, a method of manufacturing the transistor is shown in FIG. 1. Referring to FIG. 1, graphene 10 is coated with a photosensitive material 20, and a pattern of the photosensitive material 20 having a pattern similar to the pattern of a mask is formed through exposure and development using the mask formed using lithography. Thereafter, when the graphene having the pattern of the photosensitive material 20 is subjected to indirect hydrogen plasma treatment, and the pattern of the photosensitive material 20 is removed, graphene, which includes a graphene region 11 whose electrical characteristics are changed as the graphene is partially subjected to indirect hydrogen plasma treatment and a graphene region 12 in which no defects occur as the pattern of the photosensitive material 20 functions as protective films against hydrogen plasma, may be formed. Subsequently, the pattern of the photosensitive material 20 is removed, and a metal pad (not shown) configured to provide an electrical connection terminal to the outside of graphene may be formed so that precise wires can be formed on regular graphene. In this case, the graphene region whose electrical characteristics are changed may correspond to a second region of the graphene according to one exemplary embodiment of the present invention, and the graphene region in which no defects occur may correspond to a first region of the graphene according to one exemplary embodiment of the present invention. Also, the pattern is exemplified, and may vary according to a purpose, but the present invention is not limited thereto. The change in the electrical characteristics may vary widely according to a purpose. In this case, the electrical characteristics may be adjusted by varying the plasma intensity and the processing angle. According to one exemplary embodiment of the present invention, the graphene region 11 whose electrical characteristics are changed and the graphene region 12 in which no defects occur may show a low color difference which is not recognized by an observer.

Further, a touch pad is a device configured to sense that the capacitance of the touch pad corresponding to a position at which a touch is made is changed, and may be formed in a structure which is patterned into two regions having different sheet resistances. In this case, when a touch is made on the touch pad, an electrical signal generated in a region corresponding to a position at which the touch is made may transmitted to a control unit through the corresponding region and wire to recognize the coordinates of the region corresponding to the position at which the touch is made. In this case, the touch pad provided in the present invention may be applied to parts for touch panels.

Figure 2:
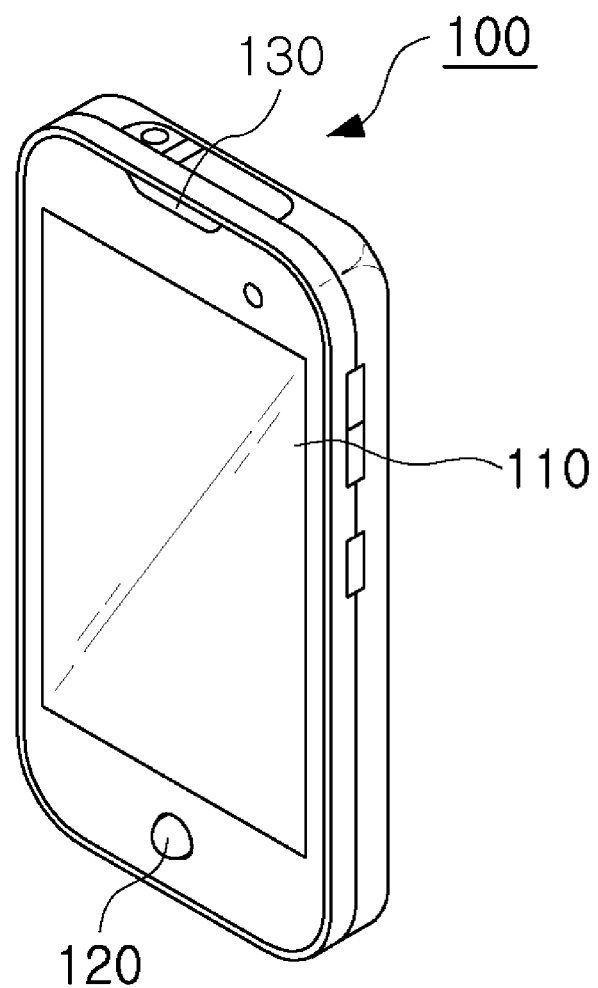
FIG. 2 is a schematic view showing the appearance of an electronic device according to one exemplary embodiment of the present invention.

Also, the touch panel may be applied to electronic devices to which a touch sensing unit is applicable. Specifically, the touch panel is one of computer input devices which are installed at display surfaces of image display devices, such as a cathode ray tube (CRT), a liquid crystal display device (LCD), a field emission display device (FED), a plasma display panel (PDP), and an electroluminescence device (ELD), input predetermined information into a computer by pressurizing (pressing or touching) the touch panel while a user views the image display device. By way of example, referring to FIG. 2, a portable telephone 100 includes a display device 110 configured to output an image, an input unit 120, an audio unit 130 configured to output the voice, and the like, and may be formed integrally with the display device 110 to provide a touch panel which is a touch sensing unit.

Figure 3:
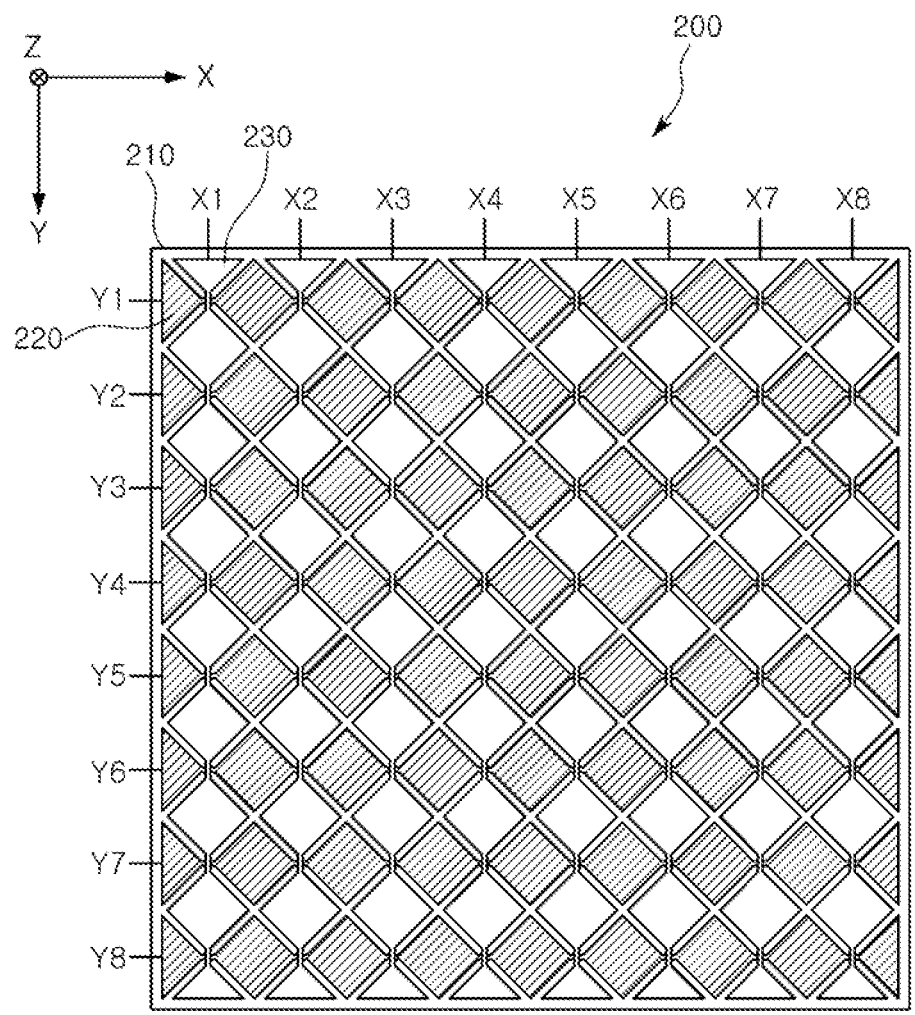
FIG. 3 is a schematic view showing a touch panel according to one exemplary embodiment of the present invention.

In this regard, the configuration of the touch panel is shown in FIG. 3. Referring to FIG. 3, a touch panel 200 includes a substrate 210, and a plurality of sensor electrodes 220 and 230 formed on the substrate 210. Each of the plurality of sensor electrodes 220 and 230 may include first electrodes 220 configured to sense a position of a touch input in a Y-axis direction, and second electrodes 230 configured to sense a position of the touch input in an X-axis direction. As shown in FIG. 3, each of the first electrodes 220 and the second electrodes 230 may be provided in a number of 8. In this case, the first electrodes 220 and the second electrodes 230 are coupled to sensing channels X1 to X8 and sensing channels Y1 to Y8 of a controller chip configured to determine whether there is a touch input. Also, FIG. 3 shows that the first electrodes 220 and the second electrodes 230 are formed on the same surface of the substrate 210 for the sake of convenience, but may be separately formed on top and bottom surfaces of the substrate 210, or may also be formed on a plurality of transparent substrates 210, respectively. That is, the plane view shown in FIG. 3 merely corresponds to one embodiment for explaining a touch panel according to one exemplary embodiment of the present invention.

Specifically, referring to FIG. 3, the touch panel according to one exemplary embodiment of the present invention is prepared by forming a graphene layer on a substrate, coating the graphene layer with a photosensitive material, and preparing lozenge- or diamond-type patterns of the photosensitive material through exposure using a mask formed using lithography, and development, as shown in FIG. 3. Thereafter, when the graphene layer having the patterns of the photosensitive material formed therein is subjected to indirect hydrogen plasma treatment, and the patterns of the photosensitive material are removed, graphene, which includes a graphene region (a second region) whose electrical characteristics are changed as the graphene is partially subjected to indirect hydrogen plasma treatment according to the patterns, and a graphene region (a first region) in which no defects occur as the patterns of the photosensitive material function as protective films against hydrogen plasma, may be formed. For example, referring to the configuration of the touch panel shown in FIG. 3, the first electrode may refer to the first region of the graphene according to one exemplary embodiment of the present invention, and the second electrode may refer to the second region of the graphene according to one exemplary embodiment of the present invention. The touch panel may show low color difference between the graphene region 11 whose electrical characteristics are changed and the graphene region 12 in which no defects occur, which is not recognized by an observer.

EXAMPLES

Hereinafter, the present invention will be described in further detail with reference to exemplary embodiments. However, it should be understood that the exemplary embodiments are not intended to limit the scope of the present invention.

Example 1

Preparation of Hydrogen Surface-Treated Graphene

An amount of injected hydrogen gas was finely controlled using a mass flow controller (MFC) installed in an indirect hydrogen plasma apparatus, and injected into the apparatus. Thereafter, the hydrogen gas in the apparatus whose inner space was left under a vacuum was maintained at an inner partial pressure of 15 mTorr or less, and a voltage was applied to generate hydrogen plasma. The generated hydrogen plasma was allowed to flow through a channel in the apparatus, and a graphene sample was positioned on the stream so that graphene was hydrogenated for 1 to 300 seconds.

Figure 4:
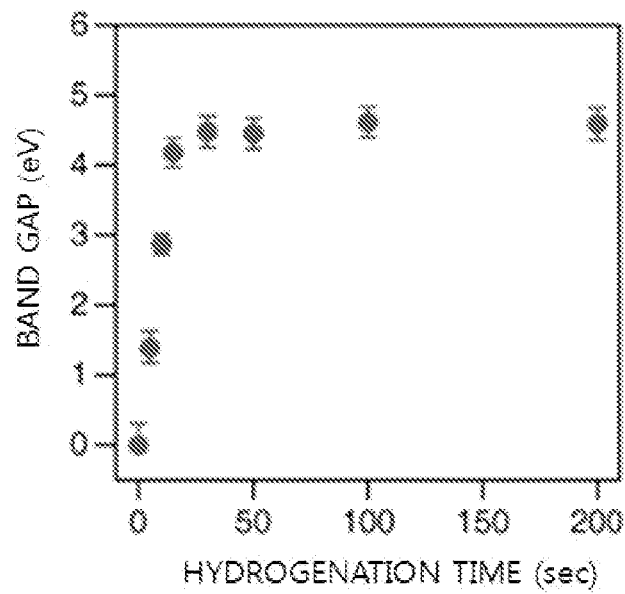
FIG. 4 is a graph illustrating a change in band gap of graphene according to an indirect hydrogen plasma treatment time according to one exemplary embodiment of the present invention.

Next, a band gap of the prepared hydrogen surface-treated graphene was measured. The results are shown in FIG. 4. Referring to FIG. 4, it could be seen that the band gap was adjusted when the hydrogenation time varied from 1 to 200 seconds. As a result, it could be seen that the maximum band gap of approximately 4.7 eV was formed.

Example 2

Preparation of Patterned Graphene

A substrate was coated with graphene, and then coated with a photosensitive material, and a mask having patterns formed therein was formed. Then, the substrate was exposed using the mask, and developed. A mask and a photosensitive material widely known in the related art was used as the mask and the photosensitive material, and the exposure and development were performed using lithography used in a conventional semiconductor process. In this case, the exposure was performed using light having wavelengths of 13 nm (EUV) to 435 nm (g-line).

Next, a graphene region from which the photosensitive material was removed by development was subjected to indirect hydrogen plasma treatment. The indirect hydrogen plasma treatment was performed by finely controlling an amount of injected hydrogen gas using MFC installed in an indirect plasma apparatus, and injecting the hydrogen gas into the apparatus. Specifically, the hydrogen gas in the apparatus whose inner space was left under a vacuum was maintained at an inner partial pressure of 15 mTorr or less, and a voltage was applied to generate hydrogen plasma. The generated hydrogen plasma was allowed to flow through a channel in the apparatus, and the graphene sample was positioned on the stream so that graphene was hydrogenated for approximately 700 seconds.

Figure 5:
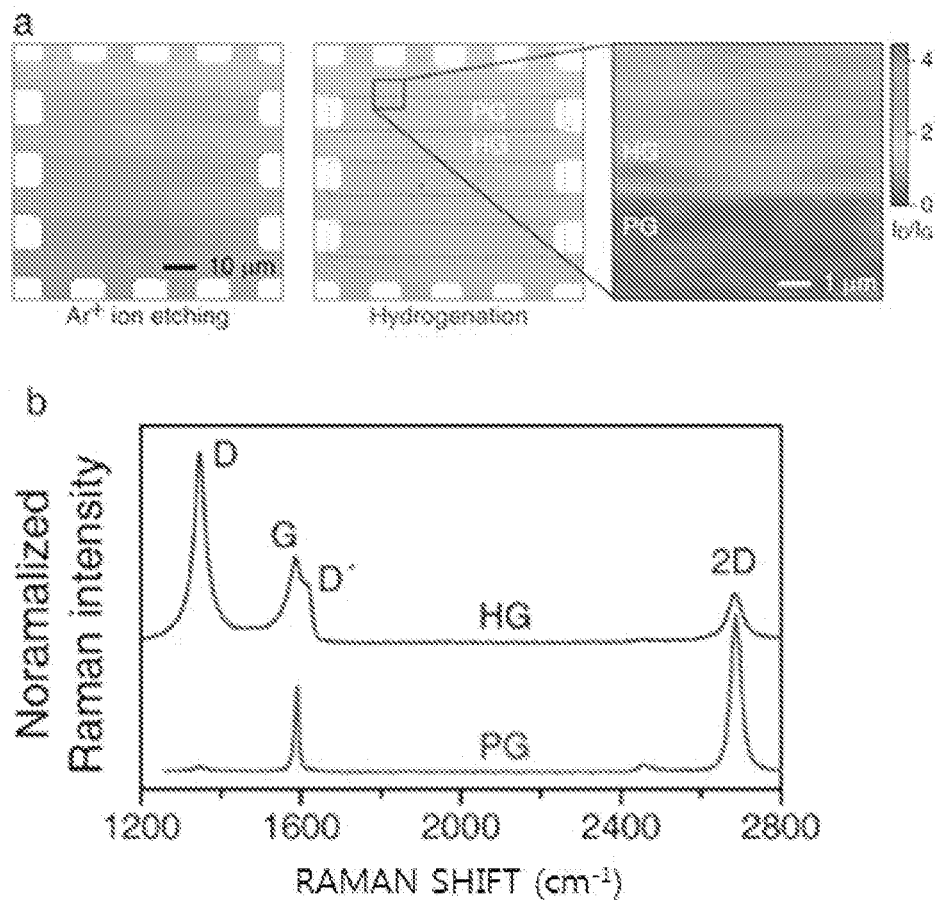
FIG. 5 shows the Raman spectra according to regions of graphene according to one exemplary embodiment of the present invention.

The prepared partially hydrogenated graphene was measured for Raman spectra. The results are shown in FIG. 5. Referring to FIG. 5A, the Raman spectra of a surface of graphene etched with argon ions (Ar+ ion etching), and a surface of graphene having patterns of a first region (PG) and a second region (HG) formed therein by means of hydrogenation were shown. Also, referring to FIG. 5B, the Raman spectra of a region (a first region) on which a mask having patterns was formed, and a region (a second region) on which the mask having the patterns was formed were shown. Specifically, it could be seen that a strong peak was observed in the vicinity of Raman shift of 2,600 to 2,700 $cm^{-1}$ in the case of the first region (PG). Also, it could be seen that a strong peak was observed in the vicinity of Raman shift of 1,300 to 1,400 $cm^{-1}$ in the case of the second region.

Example 3

Preparation of Patterned Graphene

A surface of graphene was subjected to indirect hydrogen plasma treatment. The indirect hydrogen plasma treatment was performed by finely controlling an amount of injected hydrogen gas using MFC installed in an indirect plasma apparatus, and injecting the hydrogen gas into the apparatus. Specifically, the hydrogen gas in the apparatus whose inner space was left under a vacuum was maintained at an inner partial pressure of 15 mTorr or less, and a voltage was applied to generate hydrogen plasma. The generated hydrogen plasma was allowed to flow through a channel in the apparatus, and the graphene sample was positioned on the stream so that graphene was hydrogenated for approximately 700 seconds.

Next, patterns were formed on the hydrogen surface-treated graphene by reducing a certain region of the graphene by means of heat treatment using ELA. In this case, the temperature of the surface of graphene irradiated with a laser was adjusted at 200 to 300° C.

Experimental Example 1

Figure 6:
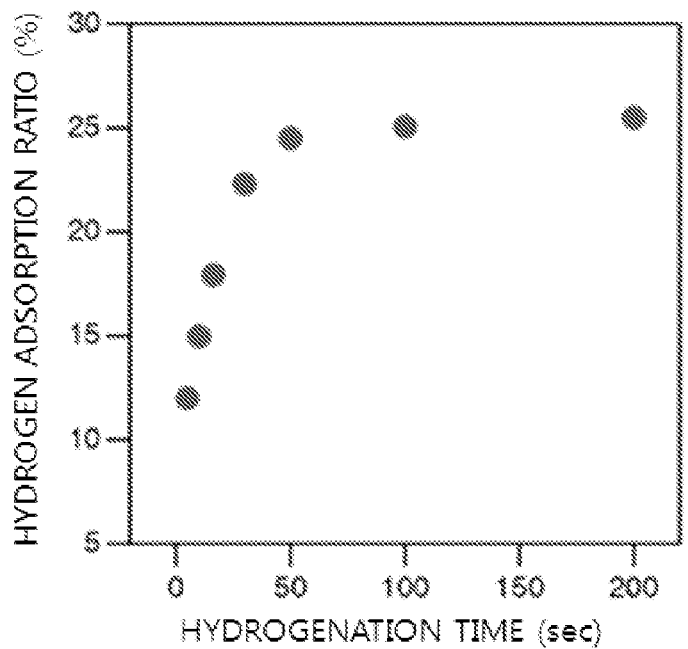
FIG. 6 is a graph illustrating the hydrogen adsorption ratio of a surface of graphene according to an indirect hydrogen plasma treatment time according to one exemplary embodiment of the present invention.

The indirect hydrogen plasma treatment was performed for different hydrogenation times ranging from 1 to 200 seconds, as described in Example 2. Thereafter, a first region and a second region on a surface of graphene surface were measured for hydrogen adsorption ratios. The measurement results are shown in FIG. 6. Referring to FIG. 6, it could be seen that the region having a hydrogen adsorption ratio of 13% or less had substantially the same hydrogen adsorption ratio as the surface of the first region. On the other hand, it could be seen that the region whose hydrogen adsorption ratio increased from 15 to 25% with an increase in hydrogenation time had substantially the same hydrogen adsorption ratio as the surface of the second region. Specifically, it could be seen that the regions had a high hydrogen adsorption ratio of 20% or more when the indirect hydrogen plasma treatment was performed for 30 seconds or more.

Also, the second region was measured for band gap. As a result, it could be seen that the band gap increased up to 5.5 eV with an increase in plasma treatment time.

From this Experimental Example 1, it could be seen that an area of the hydrogen surface treated surface of graphene increased as a time for hydrogenation of graphene increased. From these results, it could be seen that a band gap was endowed with graphene. Also, it could be seen that two regions different band gaps was able to be formed on graphene using a simple method by means of the indirect hydrogen plasma treatment when a patterned mask was used.

Experimental Example 2

An experiment for measuring a band gap was performed with different amount of injected hydrogen gas and different position angles of the graphene sample with respect to the hydrogen plasma stream, as described in Example 1. As a result, it could be seen that, when the hydrogen gas was injected at a constant amount, the band gap increased as the position angle of the graphene sample increased. Also, it could be seen that, when the graphene sample was positioned at a constant position angle, the band gap increased as the amount of injected hydrogen gas increased.

Experimental Example 3

Figure 7:
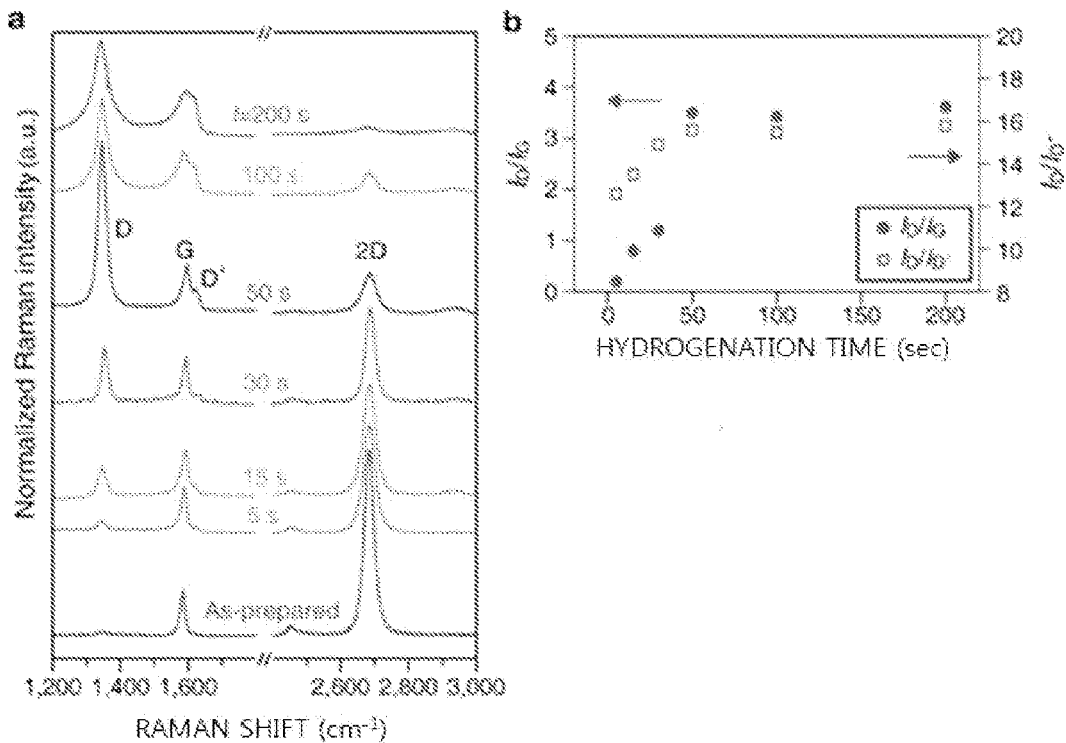
FIG. 7 is a graph illustrating the Raman spectra (a) and $I_D/I_{D'}$ ratios (b) of graphene according to an indirect hydrogen plasma treatment time according to one exemplary embodiment of the present invention.

The Raman spectra of the prepared hydrogen surface-treated graphene were measured for different treatment times ranging from 1 to 200 seconds, as described in Experimental Example 1. The results are shown in FIG. 7A. Also, a ratio (an $I_D/I_{D'}$ ratio) of an intensity of a peak D ($I_D$; an intensity of a peak observed in the vicinity of 1,350 cm$^{-1}$) to an intensity of a peak D' ($I_{D'}$; an intensity of a peak observed in the vicinity of 1,620 cm$^{-1}$) in the Raman spectra was measured. The results are shown in FIG. 7B. Referring to FIG. 7B, it could be seen that the $I_D/I_{D'}$ value was greater than or equal to 13. Thus, it could be seen that the sp3-type defects in which the hydrogen surface-treated graphene was reduced into the original form of graphene, rather than the atomic vacancy-type defects that were the defects causing permanent damage to the hydrogen surface-treated graphene, occurred on the hydrogen surface-treated graphene according to one exemplary embodiment of the present invention.

Figure 8:
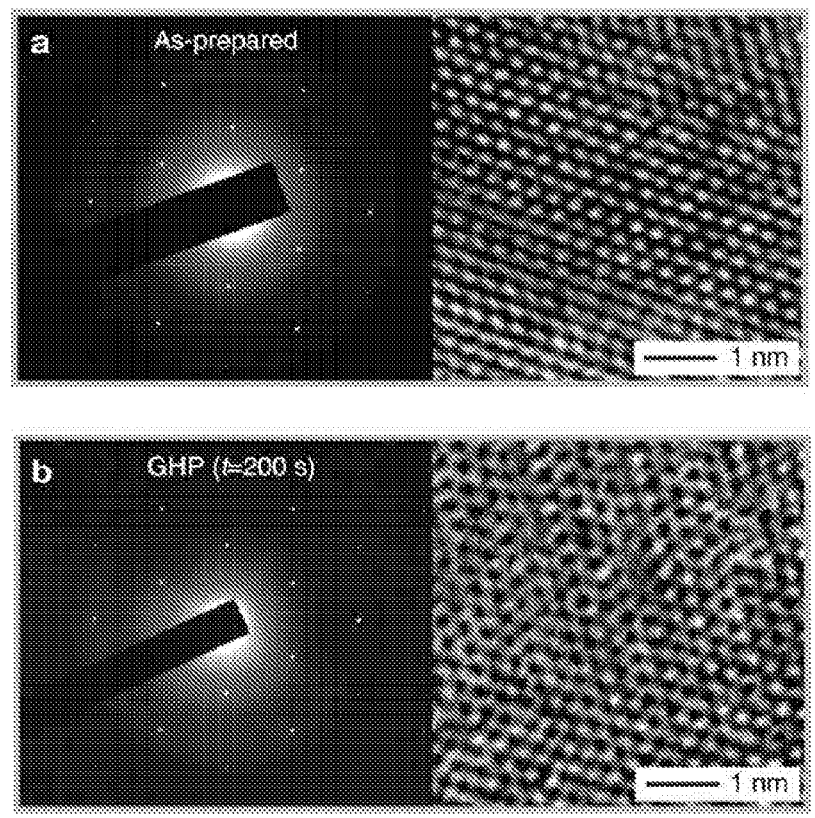
FIG. 8 shows transmission electron microscope (TEM) images of graphene before (a) and after (b) indirect hydrogen plasma treatment according to one exemplary embodiment of the present invention.

The presence of the defects was able to be confirmed on a TEM image of the hydrogen surface-treated graphene. A TEM image (a) of non-hydrogenated graphene (pristine), and a TEM image (b) of graphene (tH 200 s) surface-treated with hydrogen for 200 seconds are shown in FIG. 8. Referring to FIG. 8, it could be seen that the graphene maintained an original crystal structure and had no defects even after the indirect hydrogen plasma treatment.

Experimental Example 4

Figure 9:
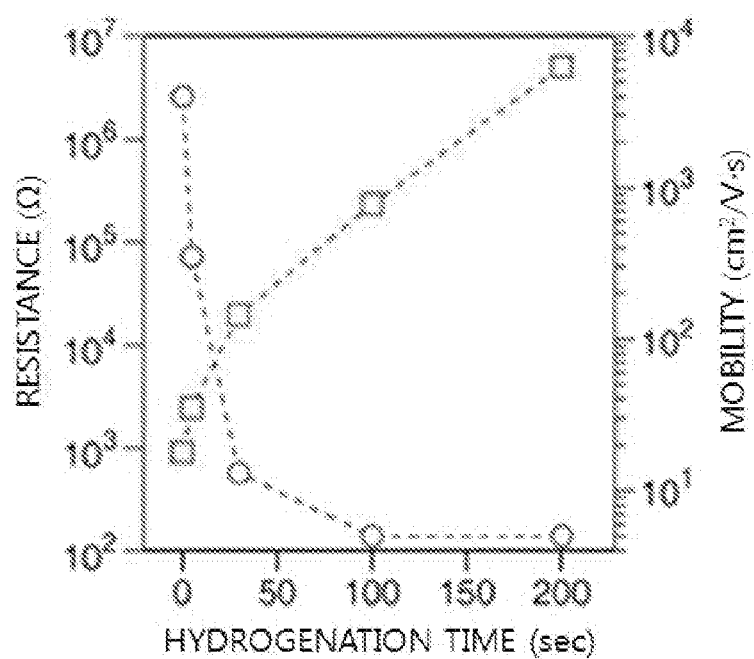
FIG. 9 is a graph illustrating the hall mobility of graphene according to an indirect hydrogen plasma treatment time according to one exemplary embodiment of the present invention.

The hall mobility of the hydrogen surface-treated second region was measured for different plasma treatment times ranging from 1 to 200 seconds for the hydrogen surface-treated graphene prepared using the method described in Example 2. The results are shown in FIG. 9. Referring to FIG. 9, it could be seen that the sheet resistance of the second region increased and the hall mobility decreased as the indirect hydrogen plasma treatment time increased. Thus, it could be seen that the band gap was formed in the second region. Also, it could be seen that, when the graphene was subjected to the indirect hydrogen plasma treatment for approximately 5 seconds, the hall mobility of silicon (Si) widely used as a conventional electronic material was realized to be greater than or equal to 160 cm$^2$/V·s.

Experimental Example 5

Figure 10:
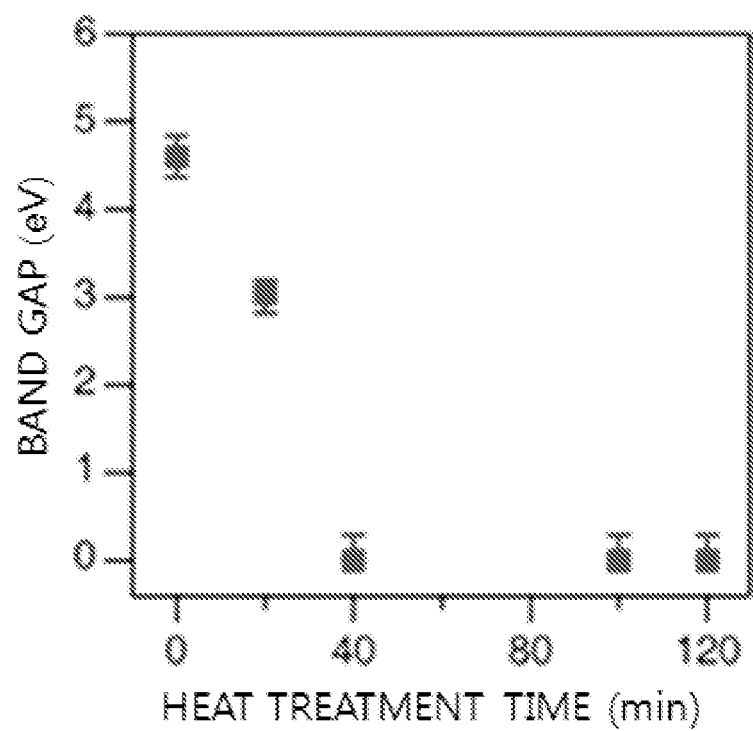
FIG. 10 is a graph illustrating a change in band gap of hydrogen surface-treated graphene according to a heat treatment time according to one exemplary embodiment of the present invention.

An experiment of reducing the hydrogen surface-treated graphene into the original form of graphene before hydrogenation by applying heat to the hydrogen surface-treated graphene was performed using the method described in Example 1. In this case, the heat treatment was performed at a temperature of 180° C. for a controlled time of 1 to 120 minutes. The results are shown in FIG. 10. Referring to FIG. 10, it could be seen that the hydrogen surface-treated graphene having a band gap of 4.7 eV prepared in Example 1 had a decreasing band gap with an increase in heat treatment time, and that the hydrogen surface-treated graphene had a band gap of 0 eV when the heat treatment was performed for approximately 40 seconds or more, indicating that the hydrogen surface-treated graphene was reduced into the original form of graphene before the indirect hydrogen plasma treatment without causing any defects.

BRIEF DESCRIPTION OF MAJOR PARTS IN THE DRAWINGS

10: graphene
11: graphene region whose electrical characteristics are changed
12: graphene region in which no defects occur
20: photosensitive material
100: portable telephone
110: display device
120: input unit
130: audio unit
200: touch panel
210: substrate
220: first electrode
230: second electrode

What is claimed is:

1. Hydrogen surface-treated graphene having a band gap of 0.1 to 5.5 eV and satisfying the following Mathematical Expression 1:

$$10 \leq I_D/I_{D'}$$ [Mathematical Expression 1]

wherein $I_D$ represents an intensity of a peak present in a region of Raman shift of 1,350±5 cm$^{-1}$, and
$I_{D'}$ represents an intensity of a peak present in a region of Raman shift of 1,620±5 cm$^{-1}$, as measured after irradiation with a 514 nm laser.

2. The hydrogen surface-treated graphene of claim 1, which comprises a first region and a second region, both of which have different band gaps, wherein the second region has a band gap of 1.0 to 5.5 eV.

3. The hydrogen surface-treated graphene of claim 2, wherein the difference between the band gaps of the first region and the second region is greater than or equal to 0.5 eV.

4. The hydrogen surface-treated graphene of claim 2, wherein the second region has a sheet resistance of 1 to 500 MΩ/sq.

5. The hydrogen surface-treated graphene of claim 1, which comprises:
a non-hydrogenated first region; and
a hydrogen surface-treated second region.

6. The hydrogen surface-treated graphene of claim 2, which satisfies the following Mathematical Expression 2:

$$\Delta E^* \leq 1.5$$ [Mathematical Expression 2]

wherein $\Delta E^*$ represents a color difference between any one point of the first region and any one point of the second region, as measured for the two points using the Commission internationale de L'Eclairage (CIE) color coordinates.

7. The hydrogen surface-treated graphene of claim 2, wherein the second region has a surface having an average hydrogen adsorption ratio of 15% or more.

8. The hydrogen surface-treated graphene of claim 2, wherein the second region has an average hall mobility of 1 to 200 cm$^2$/V·s, and
the difference between the hall mobilities of the first region and the second region is greater than or equal to 10 cm$^2$/V·s.

9. The hydrogen surface-treated graphene of claim 2, wherein the graphene has a stacked structure comprising 2 to 20 layers, and
an $n^{th}$ layer (n is an integer ranging from 2 to 20) of the graphene having the stacked structure has a pattern formed therein, the pattern comprising a non-hydrogenated first region and a hydrogen surface-treated second region.

10. The hydrogen surface-treated graphene of claim 2, wherein the graphene has a stacked structure comprising 2 to 20 layers,
- each of the layers comprises a non-hydrogenated first region and a hydrogen surface-treated second region, and
- an $n^{th}$ layer (n is an integer ranging from 2 to 20) and an $n-1^{st}$ layer of the graphene having the stacked structure include hydrogen surface-treated regions having different patterns.

* * * * *